F. COULON.
Band Knives.
No. 116,027. Patented June 20, 1871.
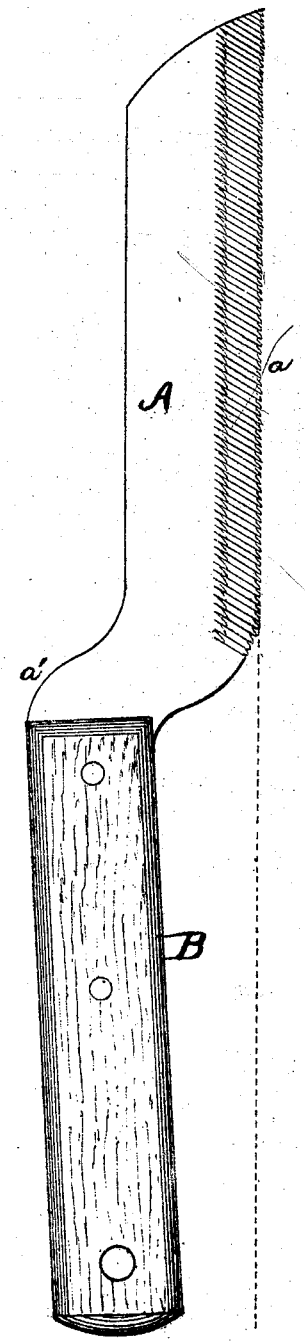
Witnesses:
E. Greenaway
S. J. Noyes
Inventor
F. Coulon by
H. W. Beadle, atty 116,027

UNITED STATES PATENT OFFICE.

FREDERICK COULON, OF ROCKFORD, ILLINOIS, ASSIGNOR TO HIMSELF, ELIAS NASHOLD, AND JACOB MARTIN, OF SAME PLACE.

IMPROVEMENT IN BAND-KNIVES.

Specification forming part of Letters Patent No. 116,027, dated June 20, 1871.

*To all whom it may concern:*

Be it known that I, FREDERICK COULON, of Rockford, in the county of Winnebago and State of Illinois, have invented a new and useful Improvement in Band-Knife; and I do hereby declare that the following is a full and exact description of the same, reference being had to the accompanying drawing and to the letters of reference marked thereon.

This invention relates to that class of knives which is provided with serrated edges for the purpose of cutting straw bands, and consists in the specific construction of the knife, as will be fully described hereinafter.

In the drawing is shown a side elevation of my improved band-knife.

To enable others skilled in the art to make and use my invention, I will now proceed to fully describe the same.

A represents the knife-blade, which is constructed with a serrated edge, $a$, and curving shank $a'$. B represents a handle of any suitable construction. The shank is curved sufficiently to give room for the hand of the operator, as the knife is grasped, above the line of the cutting-edge, by which means the hand is removed from contact with briers, thistles, &c., in the operation of cutting the bands. The curving shank also serves as a guard to prevent the hand from being accidentally crowded forward onto the serrated edge when the point becomes caught in the haste of cutting.

The knife described possesses marked advantages in practice over any now in use.

Having thus fully described my invention, what I claim as new, and desire to secure by Letters Patent, is—

The knife described, provided with the serrated edge $a$ and the abruptly-curving shank $a'$, the latter being provided for the double purpose of raising the hand above the cutting-line and of furnishing a guard to prevent the hand from being crowded forward onto the serrated edge, as set forth.

This specification signed and witnessed this 25th day of March, 1871.

FREDERICK COULON.

Witnesses:
G. W. FORD,
D. LAMONT.